United States Patent
Shimura et al.

(10) Patent No.: US 9,236,913 B2
(45) Date of Patent: Jan. 12, 2016

(54) NON-CONTACT CHARGER SYSTEM, CONTROL DEVICE, WIRELESS COMMUNICATION DEVICE, AND NON-CONTACT CHARGING DEVICE

(75) Inventors: Takuma Shimura, Kanagawa (JP); Yuji Mizuguchi, Kanagawa (JP); Kazuoki Otani, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 213 days.

(21) Appl. No.: 13/981,710

(22) PCT Filed: Jan. 31, 2012

(86) PCT No.: PCT/JP2012/000646
§ 371 (c)(1),
(2), (4) Date: Jul. 25, 2013

(87) PCT Pub. No.: WO2012/105242
PCT Pub. Date: Aug. 9, 2012

(65) Prior Publication Data
US 2013/0307474 A1    Nov. 21, 2013

(30) Foreign Application Priority Data
Feb. 4, 2011  (JP) ................. 2011-022386

(51) Int. Cl.
*H02J 7/00*  (2006.01)
*H04B 5/00*  (2006.01)
(Continued)

(52) U.S. Cl.
CPC ........... *H04B 5/0037* (2013.01); *B60L 11/182* (2013.01); *B60R 16/03* (2013.01);
(Continued)

(58) Field of Classification Search
CPC ....................................................... H02J 5/005
USPC ....................................................... 320/108
See application file for complete search history.

(56) References Cited

U.S. PATENT DOCUMENTS 5,790,014 A      8/1998  Campbell et al.
2010/0274570 A1*  10/2010  Proefke et al. ........... 705/1.1
(Continued)

FOREIGN PATENT DOCUMENTS

CN    101870277    10/2010
EP    0 874 439    10/1998
(Continued)

OTHER PUBLICATIONS

Mitsuharu Kato, Smart Entry, Denso Corporation/Nikkei Automotive Technology, "Car Electronics Illustrated (vol. 1): System", first edition, published by Nikkei Business Publications Inc., Jun. 28, 2010, with partial English language translation.
(Continued)

*Primary Examiner* — Suchin Parihar
(74) *Attorney, Agent, or Firm* — Wenderoth, Lind & Ponack, L.L.P.

(57) ABSTRACT

A control device connected to a non-contact charging device for non-contact charging a portable device and a wireless communication device for communicating with an electronic key to operate an electrical component mounted in a vehicle, includes a memory that stores a wireless communication cycle for communication between the electronic key and the wireless communication device, a wireless communication control signal output part that outputs a wireless communication control signal for controlling operation of the wireless communication device, a non-contact charge control signal output part that outputs a non-contact charge control signal for controlling operation of the non-contact charging device, and a synchronizer that synchronizes the wireless communication control signal and the non-contact charge control signal with each other.

18 Claims, 8 Drawing Sheets

(51) Int. Cl.
- *H01M 10/46* (2006.01)
- *B60R 25/40* (2013.01)
- *B60L 11/18* (2006.01)
- *B60R 16/03* (2006.01)
- *H02J 5/00* (2006.01)
- *H02J 7/02* (2006.01)

(52) U.S. Cl.
CPC ............ *B60R 25/406* (2013.01); *H01M 10/46* (2013.01); *H02J 5/005* (2013.01); *H02J 7/025* (2013.01); *Y02T 10/7005* (2013.01); *Y02T 90/122* (2013.01); *Y02T 90/14* (2013.01); *Y02T 90/16* (2013.01)

(56) References Cited

U.S. PATENT DOCUMENTS

| | | | | |
|---|---|---|---|---|
| 2011/0115605 | A1* | 5/2011 | Dimig et al. | 340/5.61 |
| 2012/0153894 | A1* | 6/2012 | Widmer | 320/108 |
| 2012/0221189 | A1* | 8/2012 | Konet et al. | 701/29.1 |
| 2012/0280574 | A1* | 11/2012 | Hur et al. | 307/104 |
| 2012/0299538 | A1* | 11/2012 | Arai et al. | 320/108 |
| 2013/0110318 | A1* | 5/2013 | Colja et al. | 701/2 |
| 2014/0217816 | A1* | 8/2014 | Okada | 307/10.1 |
| 2014/0349573 | A1* | 11/2014 | Moes et al. | 455/41.1 |
| 2015/0015198 | A1* | 1/2015 | Okada et al. | 320/108 |
| 2015/0042167 | A1* | 2/2015 | Kim et al. | 307/104 |
| 2015/0171659 | A1* | 6/2015 | Lee | 320/108 |

FOREIGN PATENT DOCUMENTS

| | | |
|---|---|---|
| JP | 11-46157 A | 2/1999 |
| JP | 2000-261971 A | 9/2000 |
| JP | 2004-76378 A | 3/2004 |
| JP | 2005-179948 A | 7/2005 |
| JP | 2008-206297 | 9/2008 |
| JP | 2009-46837 | 3/2009 |
| JP | 2009-148108 | 7/2009 |
| JP | 2010-65395 | 3/2010 |
| JP | 2010-93957 A | 4/2010 |
| JP | 2010-223863 | 10/2010 |
| WO | 2013/103943 | 7/2013 |

OTHER PUBLICATIONS

International Search Report for PCT/JP2012/000646, Apr. 24, 2012.

* cited by examiner

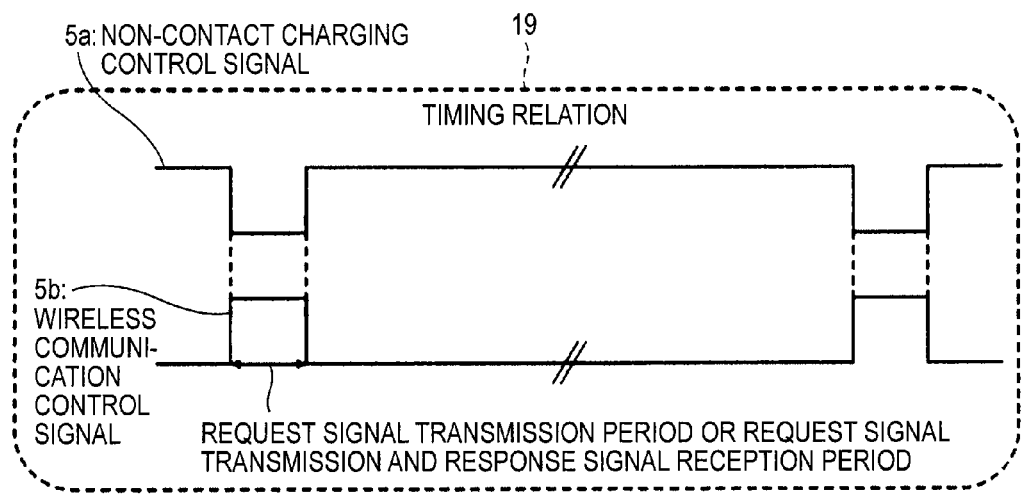

NON-CONTACT CHARGER SYSTEM, CONTROL DEVICE, WIRELESS COMMUNICATION DEVICE, AND NON-CONTACT CHARGING DEVICE

This application is a U.S. National Phase Application of PCT International Application PCT/JP2012/000646, filed Jan. 31, 2012.

TECHNICAL FIELD

The present invention relates to a synchronously controllable non-contact charging unit, a synchronously controllable wireless communication unit, a non-contact charger system which enables non-contact charge and wireless communication compatible with each other, and relates to a control device, a wireless communication device, and a non-contact charging device.

BACKGROUND ART

A keyless entry system which achieves a door lock mechanism of a car for unlocking and locking by using wireless communication has heretofore come into wide use (for example, see Non-Patent Literature 1).

A system which charges a battery of a portable communication device through communication between the portable communication device and an on-vehicle communication device has been known as the background-art keyless entry system (for example, see Patent Literature 1).

In addition, there has been heretofore known a vehicle charging system provided with a vehicle-side charging control device which has a coil for non-contact charging an on-vehicle battery loaded into the vehicle from a loop coil of an external device outside the vehicle and which transmits a charging start request signal and a charging stop request signal to the external device outside the vehicle when a predetermined condition is established, in order to prevent a bad influence on wireless communication used in the vehicle (for example, see Patent Literature 2).

A portable device such as a cell phone loaded with a rechargeable secondary battery has recently come into wide use, and development of non-contact charge has been advanced to attain further improvement in user-friendliness.

CITATION LIST

Patent Literature

Patent Literature 1: JP-A-2004-76378
Patent Literature 2: JP-A-2010-93957

Non-Patent Literature

Non-Patent Literature 1: Mitsuharu Kato, Denso Corporation/Nikkei Automotive Technology, "Car Electronics Illustrated (vol. 1): System" first edition, published by Nikkei Business Publications Inc., Jun. 28, 2010

SUMMARY OF INVENTION

Technical Problem

However, there is a problem that it is difficult to make non-contact charge and wireless communication compatible with each other because frequency bands used therein are close to each other so that non-contact charge and wireless communication according to the background art interfere with each other.

The invention is accomplished to solve the problem in the background art. An object of the invention is to provide a non-contact charger system, a control device, a wireless communication device, and a non-contact charging device in which the non-contact charger system and a wireless communication system are formed from a synchronously controllable non-contact charging unit, a synchronously controllable wireless communication unit and a control unit for synchronously controlling the non-contact charging unit and the wireless communication unit so that non-contact charge and wireless communication are compatible with each other.

Solution to Problem

In order to achieve the foregoing object, according to the invention, there is provided a control device connected to a non-contact charging device for non-contact charging a portable device and a wireless communication device for communicating with an electronic key to operate an electrical component mounted in a vehicle, wherein the control device includes a memory that stores a wireless communication cycle for communication between the electronic key and the wireless communication device, a wireless communication control signal output part that outputs a wireless communication control signal for controlling operation of the wireless communication device, a non-contact charging control signal output part that outputs a non-contact charging control signal for controlling operation of the non-contact charging device, and a synchronizer that synchronizes the wireless communication control signal and the non-contact charging control signal with each other.

Advantageous Effects of Invention

According to the invention, a control unit which synchronously controls a non-contact charging unit and a wireless communication unit is provided to prevent the non-contact charging unit and the wireless communication unit from interfering with each other in frequency bands used therein. Thus, it is possible to obtain an effect that non-contact charge and wireless communication can be operated without any obstruction.

BRIEF DESCRIPTION OF DRAWINGS

FIG. 5 A view of a timing relation between a non-contact charging control signal and a wireless communication control signal in the first embodiment of the invention.
FIG. 6 A view of the relation among the non-contact charging control signal, the wireless communication control signal, the non-contact charging unit and the wireless communication unit.

DESCRIPTION OF EMBODIMENTS

Embodiment 1

A non-contact charger system 1 in Embodiment 1 of the invention will be described below with reference to the drawings.

Figure 1:
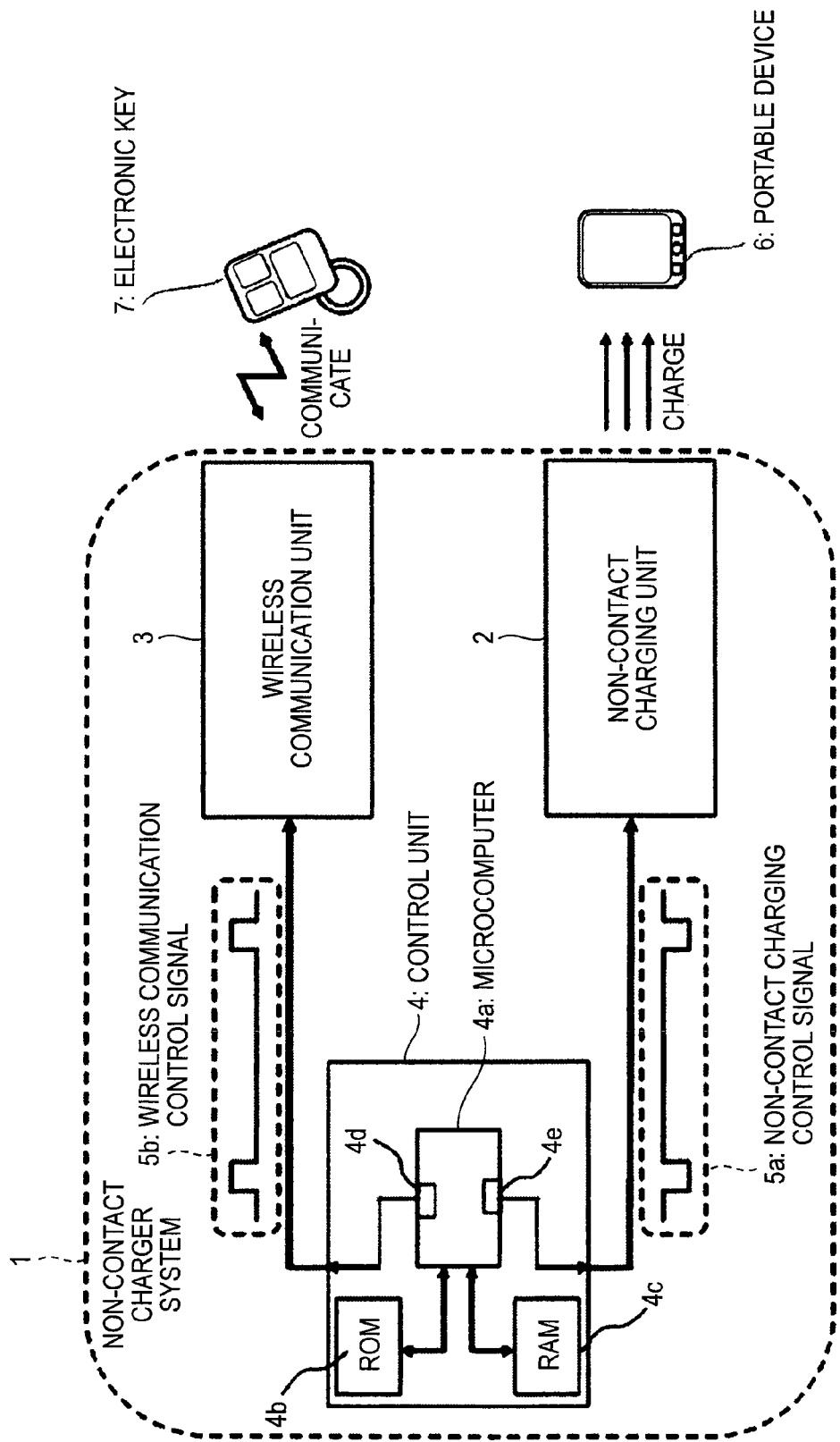
FIG. 1 A configuration diagram of a non-contact charger system in a first embodiment of the invention.

FIG. 1 is a configuration diagram of the non-contact charger system 1 in Embodiment 1 of the invention.

In FIG. 1, the non-contact charger system 1 includes a non-contact charging unit 2 as a non-contact charging device, a wireless communication unit 3 as a wireless communication device, and a control unit 4 as a control device. The non-contact charger system 1 is provided in a vehicle such as a car.

The non-contact charging unit 2 is provided for non-contact charging a portable device 6 as a cell phone, a so-called smartphone or any other portable terminal device, by using a predetermined method (which will be described later in detail) (the portable device 6 is supplied with electric power from the non-contact charging unit 2).

The wireless communication unit 3 is provided for communicating with an electronic key 7 carried by a user to thereby execute operation (such as locking/unlocking a vehicle door or starting/stopping an engine) of an electrical component mounted in the vehicle.

The control unit 4 is connected to the non-contact charging unit 2 and the wireless communication unit 3 and provided for synchronously controlling the non-contact charging unit 2 and the wireless communication unit 3.

For example, the control unit 4 is configured by a microcomputer 4a, an ROM 4b as a memory, an RAM 4c, etc. In this case, the microcomputer 4a executes a computer program stored in the ROM 4b and provided for performing control processing which will be described later, while using the RAM 4c as a work area.

In the control unit 4, the microcomputer 4a outputs a control signal which will be described later to the wireless communication unit 3 through a wireless communication control signal output part 4d, and outputs a control signal which will be described later to the non-contact charging unit 2 through a non-contact charging control signal output part 4e.

Incidentally, in this embodiment, the wireless communication control signal output part 4d and the non-contact charging control signal output part 4e are output terminals of the microcomputer 4a.

Figure 2:
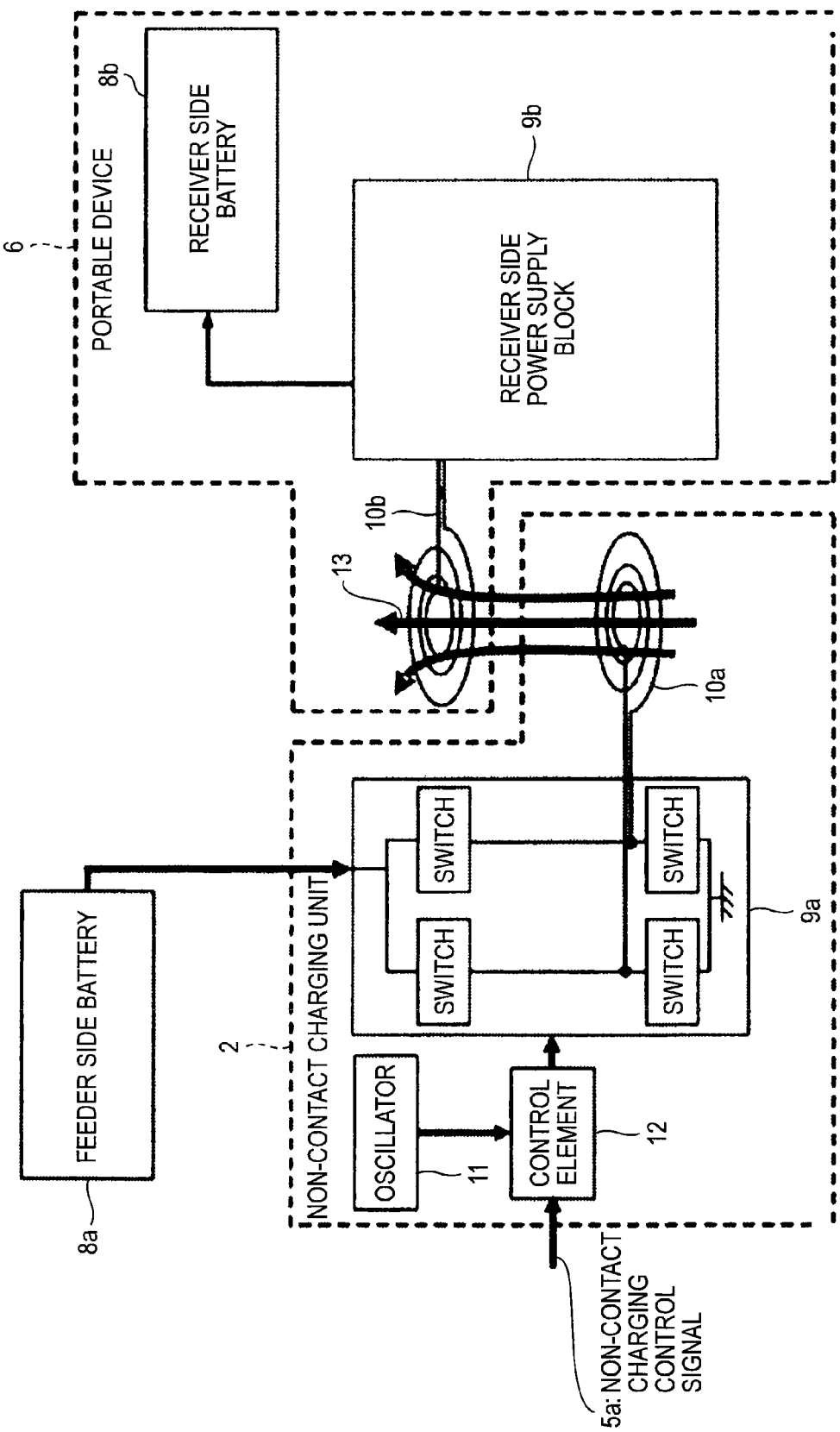
FIG. 2 A configuration diagram of a non-contact charging unit and a portable device.

Details of the non-contact charger system 1 configured as described above will be described below. First, details of the non-contact charging unit 2 and the portable device 6 will be described with reference to FIG. 2. FIG. 2 shows a configuration diagram of the non-contact charging unit 2 and the portable device 6.

A feeder side battery 8a such as a battery mounted in the vehicle is connected to the non-contact charging unit 2.

The non-contact charging unit 2 includes a feeder side power supply block 9a provided with a plurality of switch elements, a feeder side coil 10a, a control element 12 for turning the non-contact charging unit 2 operatively/inoperatively (ON/OFF) and cyclically changing over the switches of the feeder side power supply block 9a from one to another, and an oscillator 11 which generates a clock signal as a reference of the switching cycle.

In addition, the portable device 6 such as a cell phone includes a receiver side battery 8b, a receiver side power supply block 9b, and a receiver side coil 10b. Here, the receiver side battery 8b is a rechargeable secondary battery.

Further, the non-contact charging unit 2 is connected to the control unit 4. Operation of the non-contact charging unit 2 is controlled in accordance with a non-contact charging control signal 5a outputted by the control unit 4. The operative non-contact charging unit 2 operates as follows.

In the non-contact charging unit 2, electric power is supplied from the feeder side battery 8a is supplied as an AC voltage to the feeder side coil 10a while the plurality of switches of the feeder side power supply block 9a are changed over from one to another by the control element 12 at a frequency defined by the oscillator 11.

When the AC voltage is applied to the feeder side coil 10a, AC magnetic flux 13 is generated. On this occasion, induced electromotive force is generated in the receiver side coil 10b of the portable device 6. The receiver side battery 8b is charged with the generated induced electromotive force through the receiver side power supply block 9b.

Since the function of feeding electric power from the non-contact charging unit 2 and the function of charging the receiver side battery 8b through the receiver side power supply block 9b of the portable device 6 can be implemented by use of well-known technology, detailed description thereof will be omitted here.

Next, details of the wireless communication unit 3 and the electronic key 7 will be described below with reference to FIG. 3.

Figure 3:
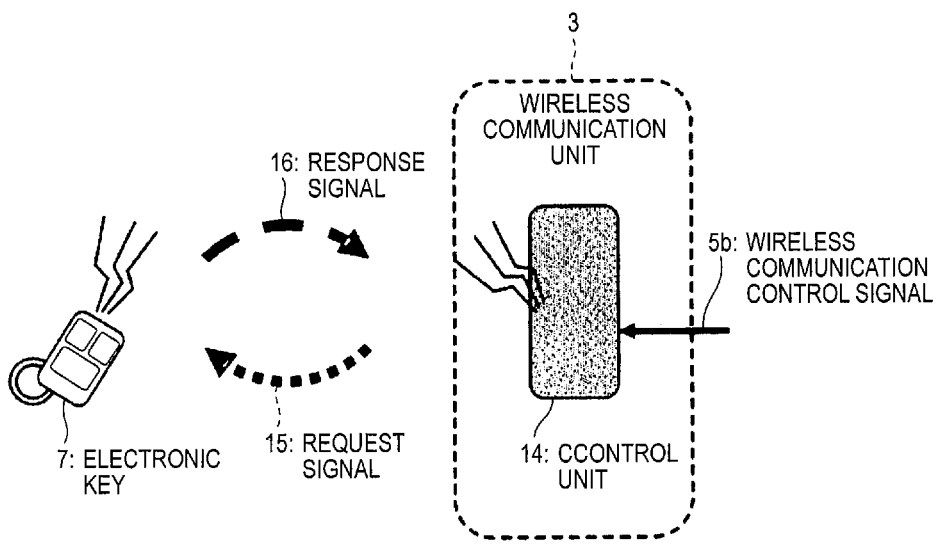
FIG. 3 A configuration diagram of a wireless communication unit and an electronic key.

FIG. 3 shows a configuration diagram of the wireless communication unit 3. The wireless communication unit 3 includes a control unit 14. The electronic key 7 and the control unit 14 transmit and receive a request signal 15 and a response signal 16.

Further, the wireless communication unit 3 is connected to the control unit 4. The wireless communication unit 3 operates as follows in accordance with a wireless communication control signal 5b outputted by the control unit 4.

The wireless communication unit 3 sends the request signal 15 intermittently toward the electronic key 7 in accordance with the wireless communication control signal 5b.

Upon reception of the request signal 15 sent from the control unit 14, the electronic key 7 sends the response signal 16 toward the control unit 14.

Since transmission/reception of the request signal 15 and the response signal 16 between the wireless communication unit 3 and the electronic key 7 can be achieved by use of well-known technology, detailed description thereof will be omitted here.

Further, details of the control unit 4 will be described with reference to FIGS. 4 to 6.

Figure 4:
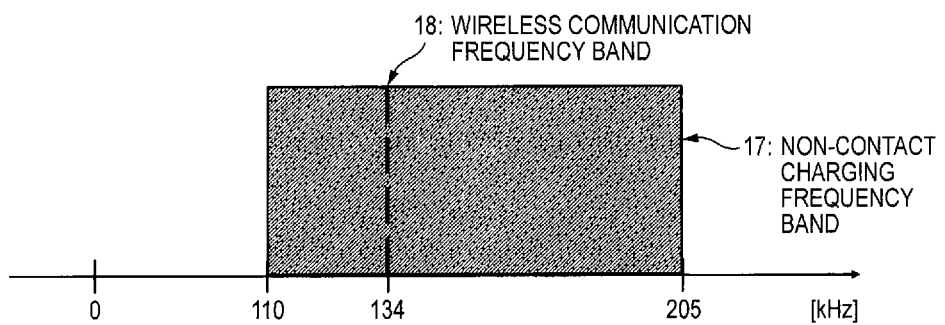
FIG. 4 A view of a relation between respective frequency bands used in the non-contact charging unit and the wireless communication unit.

FIG. 4 shows the relation between a non-contact charging frequency band 17 (frequency band used in the non-contact charging unit) and a wireless communication frequency band 18 (frequency band used in the wireless communication unit).

Generally, the frequency of the AC voltage used in the non-contact charging unit 2 is defined to be in a range of from 110 kHz to 205 kHz. Assume that the frequency of the request signal 15 of the wireless communication unit 3 is, for example, 134 kHz which is an ordinary value while the frequency of the response signal 16 is, for example, 300 kHz to 400 kHz, then there is a possibility that the non-contact charging unit 2 and the wireless communication unit 3 will interfere with each other at the frequency bands used therein so that the non-contact charging unit 2 and the wireless communication unit 3 cannot operate normally when the non-contact charging unit 2 and the wireless communication unit 3 operate simultaneously.

Therefore, in this embodiment, the control unit 4 controls the non-contact charging unit 2 and the wireless communication unit 3 as follows.

That is, the control unit 4 simultaneously outputs a non-contact charging control signal 5a and a wireless communication control signal 5b to the non-contact charging unit 2 and the wireless communication unit 3 respectively to synchronously control the non-contact charging unit 2 and the wireless communication unit 3 to change over ON/OFF of operation of non-contact charge and wireless communication in accordance with the non-contact charging control signal 5a and the wireless communication control signal 5b.

FIG. 5 shows a timing relation 19 between the non-contact charging control signal 5a and the wireless communication control signal 5b. FIG. 6 shows a relation among the non-contact charging control signal 5a, the wireless communication control signal 5b, the operating state of the non-contact charging unit 2 and the operating state of the wireless communication unit 3.

The non-contact charging control signal 5a and the wireless communication control signal 5b are outputted from the control unit 4 while synchronized with each other so that the non-contact charging control signal 5a is outputted as an inverted signal of the wireless communication control signal 5b from the control unit 4. In this manner, operation of the non-contact charge and operation of the wireless communication can be controlled respectively.

Specifically, when the wireless communication control signal 5b is high while the non-contact charging control signal 5a is low, the wireless communication unit 3 sends the request signal 15 to the electronic key 7. Incidentally, transmission of the request signal 15 and reception of the response signal 16 may be performed in the aforementioned period.

When the wireless communication control signal 5b is low while the non-contact charging control signal 5a is high, the non-contact charging unit 2 is operated to charge the portable device 6.

Since it is necessary to confirm the location of the electronic key, the wireless communication unit 3 and the electronic key 7 need to communicate with each other periodically.

However, when the non-contact charging unit 2 operates while the wireless communication unit 3 and the electronic key 7 communicate with each other, there is a possibility that the wireless communication unit 3 and the non-contact charging unit 2 may interfere with each other in frequency bands used therein so that the non-contact charging unit 2 and the wireless communication unit 3 cannot operate normally. Therefore, the period of time in which the non-contact charging unit 2 feeds electric power to the portable device 6 (the portable device 6 is charged) needs to be out of the period of time in which the wireless communication unit 3 sends the request signal 15 or out of the period of time in which the wireless communication unit 3 sends the request signal 15 and receives the response signal 16.

Accordingly, the ON/OFF switching timing of operation of the non-contact charge and the wireless communication is stored in the control unit 4 so that operation of the non-contact charge and the wireless communication is turned on/off in a period of time which is set in advance in consideration of this point.

This can be achieved in such a manner that the cycle in which the electronic key 7 and the wireless communication unit 3 communicate with each other is stored in advance in the memory such as the ROM 4b provided in the control unit, the wireless communication control signal 5b is generated and outputted to the wireless communication unit 3 based on the cycle, and the wireless communication control signal 5b is inverted by use of a simple logic circuit so that the inverted signal is used as the non-contact charging control signal 5a. In this case, the simple logic circuit serves as a synchronizer.

Alternatively, the wireless communication control signal 5b may be inverted as described above by arithmetic processing performed by the microcomputer 4a, or two synchronized signals may be calculated by the microcomputer 4a so that the wireless communication control signal 5b and the non-contact charging control signal 5a are switched from one to the other at the aforementioned timing. In this case, the microcomputer 4a serves as the synchronizer and, for example, the RAM 4c serves as the memory.

Incidentally, the cycle stored in advance in the ROM 4b may be used as the cycle for communication (wireless communication cycle) between the electronic key 7 and the wireless communication unit 3 or the microcomputer 4a may dynamically calculate the cycle for communication between the electronic key 7 and the wireless communication unit 3 in consideration of the surrounding situation or environment.

As described above, in this embodiment, operation/non-operation (ON/OFF) of the non-contact charging unit 2 and the wireless communication unit 3 is switched while synchronized, and the control unit 4 makes control to suppress operation of the non-contact charge and the wireless communication. In this manner, the non-contact charging unit 2 and the wireless communication unit 3 can be prevented from interfering with each other in frequency bands used therein. Accordingly, no obstruction occurs so that non-contact charge and wireless communication are compatible with each other.

Figure 7:
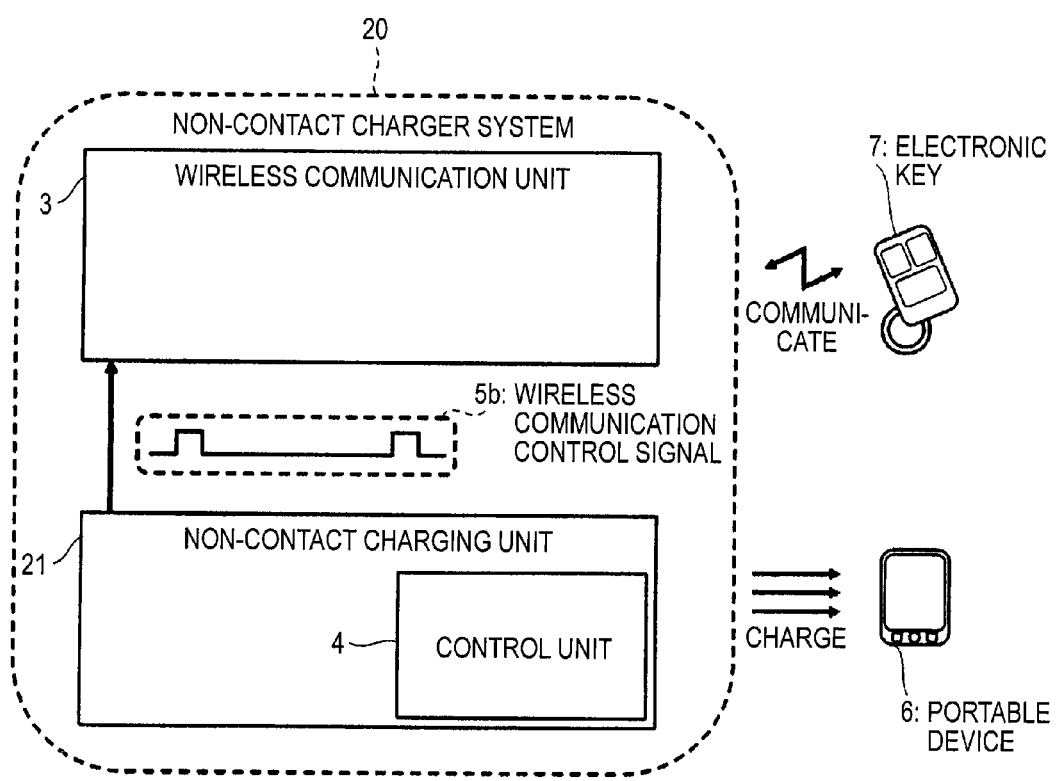
FIG. 7 A configuration diagram of a non-contact charger system formed from a non-contact charging unit having a control function.
Figure 8:
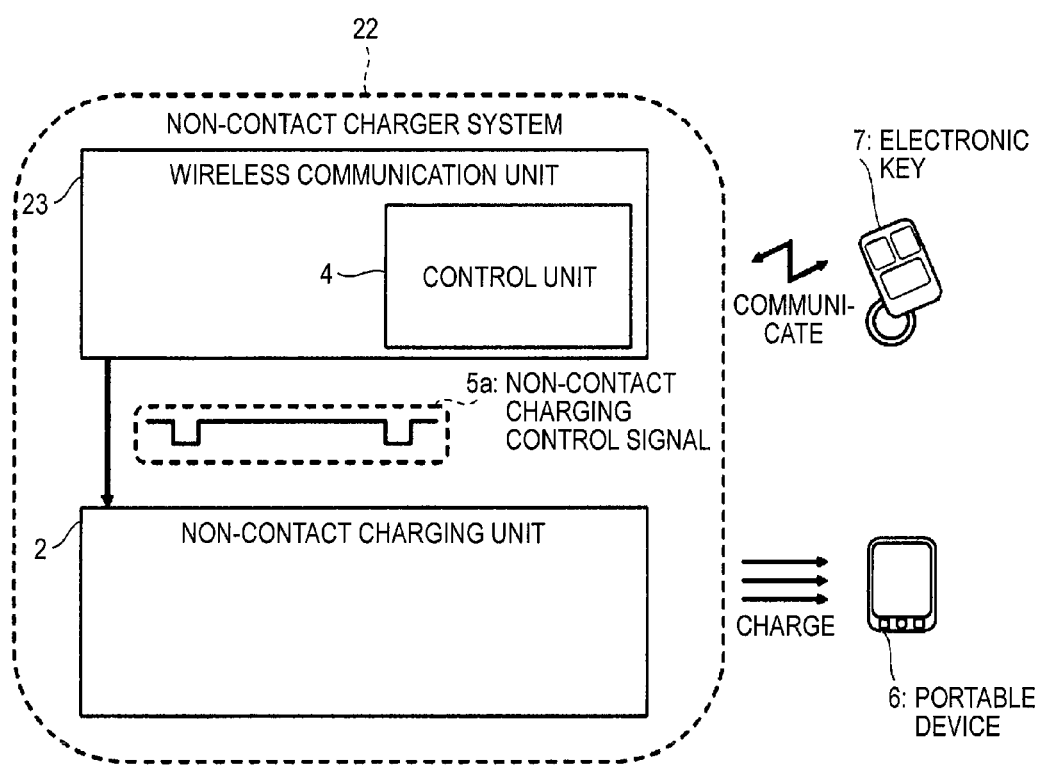
FIG. 8 A configuration diagram of a non-contact charger system formed from a wireless communication unit having a control function.

Although the non-contact charger system 1 according to the embodiment has been described in the case where the control unit 4 is independent, the invention may be carried out likewise when a non-contact charger system 20 configured so that the control unit 4 is included in a non-contact charging unit 21 or a non-contact charger system 22 configured so that the control unit 4 is included in a wireless communication unit 23 is used as shown in FIG. 7 or 8.

Embodiment 2

A non-contact charger system 24 in Embodiment 2 of the invention will be described below with reference to the drawings.

In the embodiment, the same constituent parts as those in Embodiment 1 will be referred to by the same numerals as those in Embodiment 1, and detailed description thereof will be omitted.

Figure 9:
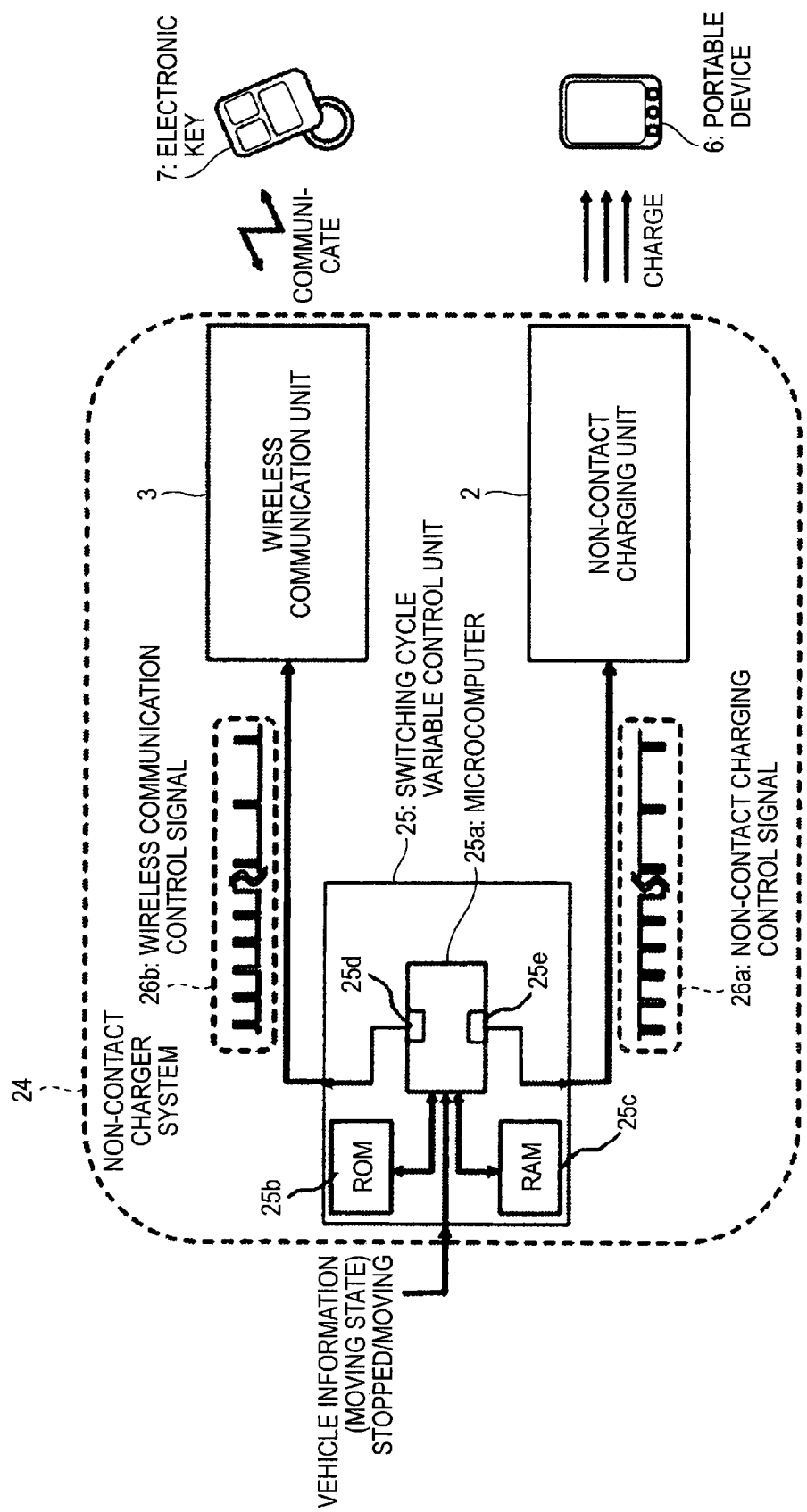
FIG. 9 A configuration diagram of a non-contact charger system in a second embodiment of the invention.

FIG. 9 is a configuration diagram of the non-contact charger system 24 in Embodiment 2 of the invention.

In FIG. 9, the non-contact charger system 24 includes a non-contact charging unit 2, a wireless communication unit 3, and a switching cycle variable control unit 25. Similarly to Embodiment 1, the respective units are provided in a vehicle such as a car.

A portable device 6 is supplied with electric power from the non-contact charging unit 2. An electronic key 7 communicates with the wireless communication unit 3.

For example, the switching cycle variable control unit 25 includes a microcomputer 25a, an ROM 25b, and an RAM 25c. In this case, the microcomputer 25a executes a computer program stored in the ROM 25b and provided for performing control processing which will be described later, while using the RAM 25c as a work area.

In the switching cycle variable control unit 25, the microcomputer 25a outputs a control signal which will be described later to the wireless communication unit 3 through a wireless communication control signal output part 25d, and outputs a control signal which will be described later to the non-contact charging unit 2 through a non-contact charging control signal output part 25e.

Incidentally, in the embodiment, the wireless communication control signal output part 25d and the non-contact charging control signal output part 25e are output terminals of the microcomputer 25a.

The point of difference of Embodiment 2 from Embodiment 1 lies in that the switching cycle variable control unit 25 synchronously controlling the non-contact charging unit 2 and the wireless communication unit 3 is provided with (or connected to) a moving state detector which detects a vehicle moving state (as to whether the vehicle is moving or not) to control the switching cycle of the non-contact charging unit and the wireless communication unit in accordance with the vehicle moving state (for example, vehicle speed).

Detection of the vehicle moving state can be achieved easily in such a manner that vehicle speed information is obtained from a speed meter or the like provided in the vehicle to determine whether the current vehicle speed is lower than a predetermined speed or not.

Control operation of the non-contact charger system 24 configured as described above will be described below.

In the embodiment, the switching cycle variable control unit 25 simultaneously outputs a non-contact charging control signal 26a to the non-contact charging unit 2 and a wireless communication control signal 26b to the wireless communication unit 3 respectively to thereby synchronously control the non-contact charging unit 2 and the wireless communication unit 3 in accordance with the non-contact charging control signal 26a and the wireless communication control signal 26b. In addition, the switching cycle variable control unit 25 variably controls a switching cycle for switching ON/OFF operation of the non-contact charge and the wireless communication.

Specifically, when the wireless communication control signal 26b is high while the non-contact charging control signal 26a is low, the wireless communication unit 3 sends the request signal 15 to the electronic key 7.

Incidentally, transmission of the request signal 15 and reception of the response signal 16 may be performed in the aforementioned period.

When the wireless communication control signal 26b is low while the non-contact charging control signal 26a is high, the non-contact charging unit 2 is operated to charge the portable device 6.

Incidentally, the switching cycle for switching ON/OFF operation of the non-contact charge and the wireless communication on this occasion is changed in accordance with a result of detection made by the switching cycle variable control unit 25 as to whether the vehicle is stopped or moving, as described below.

That is, the switching cycle variable control unit 25 is configured to receive information (signal) indicating whether the vehicle is stopped or moving. The switching cycle variable control unit 25 changes the switching cycle based on this information.

Whether the vehicle is stopped or moving may be determined based on a signal obtained from a vehicle speed sensor as follows. Determination is made that the vehicle is stopped when the vehicle speed is lower than a predetermined speed (for example, 20 km/h or the like). Determination is made that the vehicle is moving when the vehicle speed is not lower than the predetermined speed. Alternatively, change of position information obtained from GPS may be used.

Figure 10:
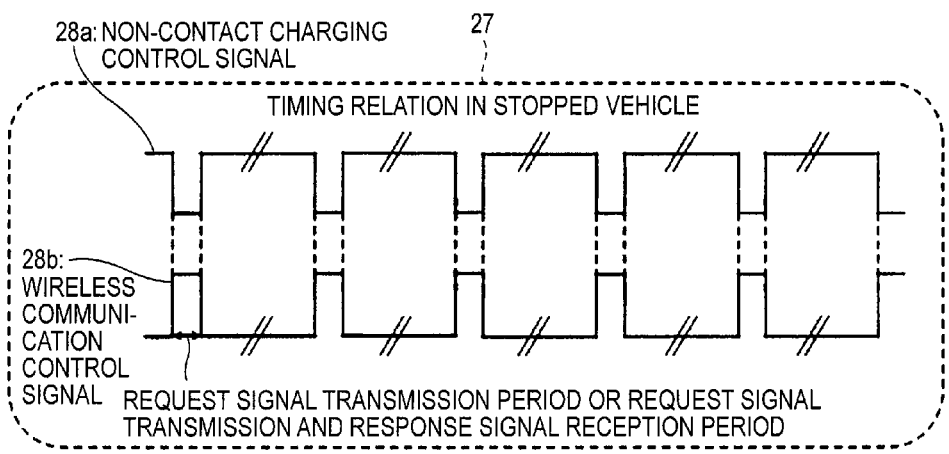
FIG. 10 A view of a timing relation between a non-contact charging control signal and a wireless communication control signal in a stopped vehicle in the second embodiment of the invention.
Figure 11:
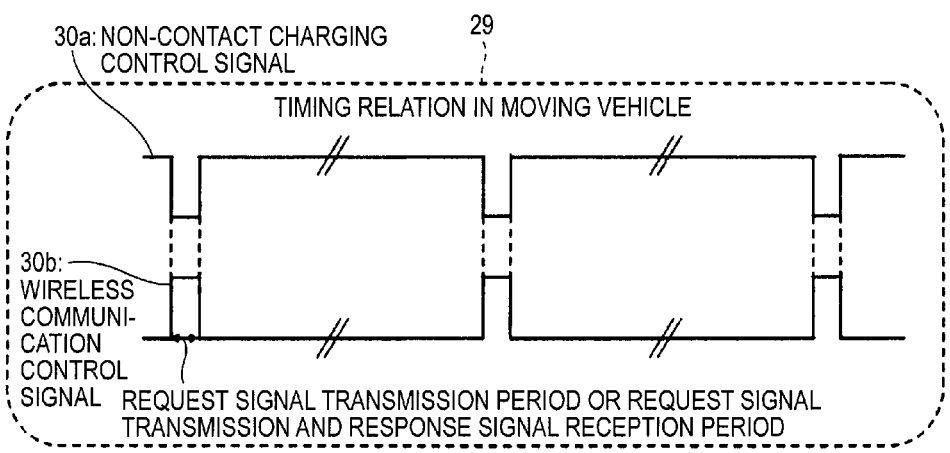
FIG. 11 A view of a timing relation between the non-contact charging control signal and the wireless communication control signal in a moving vehicle in the second embodiment of the invention.

FIG. 10 shows a timing relation in a stopped vehicle 27 between a non-contact charging control signal 28a and a wireless communication control signal 28b. FIG. 11 shows a timing relation in a moving vehicle 29 between a non-contact charging control signal 30a and a wireless communication control signal 30b.

The non-contact charging control signal 28a and the wireless communication control signal 28b are synchronized with each other. The non-contact charging control signal 28a is set as an inverted signal of the wireless communication control signal 28b to suppress operation of the non-contact charge and the wireless communication.

In addition, the non-contact charging control signal 30a and the wireless communication control signal 30b are synchronized with each other. The non-contact charging control signal 30a is set as an inverted signal of the wireless communication control signal 30b to suppress operation of the non-contact charge and the wireless communication.

As shown in FIG. 10, ON/OFF of operation of non-contact charge and wireless communication is changed over so that priority is given to wireless communication to make communication frequently when the vehicle is stopped. On the other hand, as shown in FIG. 11, ON/OFF of operation of non-contact charge and wireless communication is changed over so that priority is given to charging to make charging frequently when the vehicle is moving. In this manner, battery charging efficiency of the portable device 6 can be improved.

Incidentally, when the vehicle is moving, the operation of non-contact charge may be always turned on without wireless communication so that the portable device 6 can be charged.

That is, the situation that the vehicle is stopped is a situation that the possessor of the electronic key 7 can carry the electronic key 7 to the outside of the vehicle easily, and that wireless communication has to be made frequently to confirm the location of the electronic key 7. On the other hand, the situation that the vehicle is moving is a situation that the possessor of the electronic key 7 can carry the electronic key 7 to the outside of the vehicle hardly, and that frequent non-contact charge is allowed.

As described above, in the embodiment, the switching cycle of the non-contact charging control signal 26a and the wireless communication control signal 26b is controlled variably. Accordingly, when the ON period of the non-contact charging control signal 26a is set to be long, battery charging efficiency of the portable device 6 can be improved by the non-contact charging unit 2. In addition, when communication is not performed, the system may be used in the condition that the non-contact charging control signal 26a is always turned on.

Although the invention has been described in detail and with reference to specific embodiments, it is obvious to those skilled in the art that various changes and modifications may be made without departing from the sprint and scope of the invention.

The present application is based on Japanese Patent Application (Patent Application 2011-022386) filed on Feb. 4, 2011, the contents of which are incorporated herein by reference.

INDUSTRIAL APPLICABILITY

In the invention, the non-contact charging unit, the wireless communication unit and the control unit synchronously controlling the non-contact charging unit and the wireless communication unit are useful as a non-contact charger system because non-contact charge and wireless communication are compatible with each other.

REFERENCE SIGNS LIST 1 non-contact charger system
2 non-contact charging unit
3 wireless communication unit
4 control unit
4a microcomputer
4b ROM
4c RAM
4d wireless communication control signal output part
4e non-contact charging control signal output part
5a non-contact charging control signal
5b wireless communication control signal
6 portable device
7 electronic key
8a feeder side battery
8b receiver side battery
9a feeder side power supply block
9b receiver side power supply block
10a feeder side coil
10b receiver side coil
11 oscillator
12 control element
13 AC magnetic flux
14 control unit
15 request signal
16 response signal
17 non-contact charging frequency band
18 wireless communication frequency band
19 timing relation
20 non-contact charger system
21 non-contact charging unit
22 non-contact charger system
23 wireless communication unit
24 non-contact charger system
25 switching cycle variable control unit
25a microcomputer
25b ROM
25c RAM
25d wireless communication control signal output part
25e non-contact charging control signal output part
26a non-contact charging control signal
26b wireless communication control signal
27 timing relation in stopped vehicle
28a non-contact charging control signal
28b wireless communication control signal
29 timing relation in moving vehicle
30a non-contact charging control signal
30b wireless communication control signal

The invention claimed is:

1. A control device connected to a non-contact charging device for charging a portable device by non-contact and a wireless communication device for communicating with an electronic key to operate an electrical component mounted in a vehicle, the control device comprising:
 a memory that stores a wireless communication cycle for communication between the electronic key and the wireless communication device;
 a wireless communication control signal output part that outputs a wireless communication control signal for controlling operation of the wireless communication device;
 a non-contact charging control signal output part that outputs a non-contact charging control signal for controlling operation of the non-contact charging device; and
 a synchronizer that synchronizes the wireless communication control signal and the non-contact charging control signal with each other.

2. The control device according to claim 1, further comprising:
 a moving state detector that detects a moving state of the vehicle equipped with the control device,
 wherein the control device changes the wireless communication cycle in accordance with a result detected by the moving state detector and outputs the wireless communication control signal.

3. The control device according to claim 1, wherein the wireless communication control signal IS a switching signal for switching ON/OFF of the communication between the electronic key and the wireless communication device;
 wherein the non-contact charging control signal is a switching signal for switching ON/OFF of a charging operation of the non-contact charging device; and
 wherein the wireless communication control signal is set as an inverted signal of the non-contact charging control signal.

4. A wireless communication device for making communication with an electronic key to operate an electrical component mounted in a vehicle and which is connected to a non-contact charging device for charging a portable device by non-contact, the wireless communication device comprising:
 a memory that stores a wireless communication cycle for communication between the electronic key and the wireless communication device;
 a controller having a synchronizer that synchronizes a wireless communication control signal for controlling operation of the wireless communication device and a non-contact charging control signal for controlling operation of the non-contact charging device with each other; and
 a non-contact charging control signal output part that outputs the non-contact charging control signal synchronized with the wireless communication control signal by the synchronizer to the non-contact charging device.

5. The wireless communication device according to claim 4, wherein the controller has a moving state detector that detects a moving state of the vehicle equipped with the wireless communication device; and
 wherein the controller changes the wireless communication cycle in accordance with a result detected by the moving state detector and outputs the wireless communication control signal.

6. The wireless communication device according to claim 4, wherein the wireless communication control signal is a switching signal for switching ON/OFF of the communication between the electronic key and the wireless communication device;
 wherein the non-contact charging control signal is a switching signal for switching ON/OFF of a charging operation of the non-contact charging device; and wherein the wireless communication control signal is set as an inverted signal of the non-contact charging control signal.

7. A non-contact charging device for charging a portable device by non-contact and which is connected to a wireless communication device for making communication with an electronic key to operate an electrical component mounted in a vehicle, the non-contact charging device comprising:
a memory that stores a wireless communication cycle for communication between the electronic key and the wireless communication device;
a controller having a synchronizer that synchronizes a wireless communication control signal for controlling operation of the wireless communication device and a non-contact charging control signal for controlling operation of the non-contact charging device with each other; and
a wireless communication control signal output part that outputs the wireless communication control signal to the wireless communication device,
wherein the wireless communication control signal outputted to the wireless communication device and the non-contact charging control signal are signals which are synchronized with each other by the synchronizer.

8. A non-contact charging device according to claim 7, wherein the controller has a moving state detector that detects a moving state of the vehicle equipped with the non-contact charging device; and
wherein the controller changes the wireless communication cycle in accordance with a result detected by the moving state detector and outputs the wireless communication control signal.

9. The non-contact charging device according to claim 7, wherein the wireless communication control signal is a switching signal for switching ON/OFF of the communication between the electronic key and the wireless communication device;
wherein the non-contact charging control signal is a switching signal for switching ON/OFF of a charging operation of the non-contact charging device; and
wherein the wireless communication control signal is set as an inverted signal of the non-contact charging control signal.

10. A non-contact charger system comprising:
a non-contact charging device for non-contact charging a portable device;
a wireless communication device for making communication with an electronic key to operate an electrical component mounted in a vehicle; and
a control device connected to the non-contact charging device and the wireless communication device,
wherein the control device includes:
a memory that stores a wireless communication cycle for communication between the electronic key and the wireless communication device;
a wireless communication control signal output part that outputs a wireless communication control signal for controlling operation of the wireless communication device;
a non-contact charging control signal output part that outputs a non-contact charging control signal for controlling operation of the non-contact charging device; and
a synchronizer that synchronizes the wireless communication control signal and the non-contact charging control signal with each other.

11. A non-contact charger system according to claim 10, wherein the control device further includes a moving state detector that detects a moving state of the vehicle equipped with the control device; and
wherein the control device changes the wireless communication cycle in accordance with a result detected by the moving state detector and outputs the wireless communication control signal.

12. The non-contact charger system according to claim 10, wherein the wireless communication control signal is a switching signal for switching ON/OFF of the communication between the electronic key and the wireless communication device;
wherein the non-contact charging control signal is a switching signal for switching ON/OFF of a charging operation of the non-contact charging device; and
wherein the wireless communication control signal is set as an inverted signal of the non-contact charging control signal.

13. A non-contact charger system comprising:
a wireless communication device for making communication with an electronic key to operate an electrical component mounted in a vehicle; and
a non-contact charging device for non-contact charging a portable device,
wherein the wireless communication device includes:
a memory that stores a wireless communication cycle for communication between the electronic key and the wireless communication device;
a controller having a synchronizer that synchronizes a wireless communication control signal for controlling operation of the wireless communication device and a non-contact charging control signal for controlling operation of the non-contact charging device with each other; and
a non-contact charging control signal output part that outputs the non-contact charging control signal synchronized with the wireless communication control signal by the synchronizer to the non-contact charging device.

14. The non-contact charger system according to claim 13, wherein the controller further includes a moving state detector that detects a moving state of the vehicle equipped with the wireless communication device and the non-contact charging device; and
wherein the controller changes the wireless communication cycle in accordance with a result detected by the moving state detector and outputs the wireless communication control signal.

15. The non-contact charger system according to claim 13, wherein the wireless communication control signal is a switching signal for switching ON/OFF of the communication between the electronic key and the wireless communication device;
wherein the non-contact charging control signal is a switching signal for switching ON/OFF of a charging operation of the non-contact charging device; and
wherein the wireless communication control signal is set as an inverted signal of the non-contact charging control signal.

16. A non-contact charger system comprising:
a wireless communication device for making communication with an electronic key to operate an electrical component mounted in a vehicle; and
a non-contact charging device for non-contact charging a portable device, wherein the non-contact charging device includes:
- a memory that stores a wireless communication cycle for communication between the electronic key and the wireless communication device;
- a controller having a synchronizer that synchronizes a wireless communication control signal for controlling operation of the wireless communication device and a non-contact charging control signal for controlling operation of the non-contact charging device with each other; and
- a wireless communication control signal output part that outputs the wireless communication control signal to the wireless communication device; and
- wherein the wireless communication control signal outputted to the wireless communication device and the non-contact charging control signal are signals which are synchronized with each other by the synchronizer.

17. The non-contact charger system according to claim 16, wherein the controller further includes a moving state detector that detects a moving state of the vehicle equipped with the wireless communication device and the non-contact charging device; and wherein the controller changes the wireless communication cycle in accordance with a result detected by the moving state detector and outputs the wireless communication control signal.

18. The non-contact charger system according to claim 16, wherein the wireless communication control signal is a switching signal for switching ON/OFF of the communication between the electronic key and the wireless communication device;
- wherein the non-contact charging control signal is a switching signal for switching ON/OFF of a charging operation of the non-contact charging device; and
- wherein the wireless communication control signal is set as an inverted signal of the non-contact charging control signal.

* * * * *